United States Patent
Yajima et al.

(10) Patent No.: US 6,268,878 B1
(45) Date of Patent: Jul. 31, 2001

(54) OPTICAL WRITING HEAD DRIVING DEVICE AND METHOD OF DRIVING OPTICAL WRITING HEAD

(75) Inventors: Toshiaki Yajima, Iruma; Jun Hashimoto, Hamura; Toshio Nagasaka, Iruma, all of (JP)

(73) Assignees: Casio Computer Co., Ltd., Tokyo; Casio Electronics Manufacturing Co., Ltd., Iruma, both of (JP)

( * ) Notice: Subject to any disclaimer, the term of this patent is extended or adjusted under 35 U.S.C. 154(b) by 0 days.

(21) Appl. No.: 09/184,831

(22) Filed: Nov. 2, 1998

(30) Foreign Application Priority Data

Nov. 10, 1997 (JP) .................................................... 9-306897

(51) Int. Cl.$^7$ .................................................... B41J 2/435
(52) U.S. Cl. .......................... 347/247; 347/237; 358/1.16
(58) Field of Search .................................... 347/130, 247, 347/237, 132, 225, 226, 238; 358/1.16, 1.17

(56) References Cited

U.S. PATENT DOCUMENTS

| | | | |
|---|---|---|---|
| 3,991,305 | * 11/1976 | Caudel et al. | 235/156 |
| 4,455,562 | 6/1984 | Dolan et al. | 347/130 |
| 4,596,995 | * 6/1986 | Yamakawa et al. | 347/237 |
| 4,716,525 | * 12/1987 | Gilanyi et al. | 364/200 |
| 5,233,337 | * 8/1993 | Takahashi | 347/130 |
| 5,307,089 | 4/1994 | Takasu et al. | 347/238 |
| 5,668,587 | * 9/1997 | Hammond et al. | 347/130 |
| 5,774,165 | * 6/1998 | Nakajima et al. | 347/236 |
| 5,804,805 | * 9/1998 | Koenck et al. | 235/462 |

FOREIGN PATENT DOCUMENTS 4-288250    10/1992   (JP) .

* cited by examiner

*Primary Examiner*—N. Le
*Assistant Examiner*—Lamson D. Nguyen
(74) *Attorney, Agent, or Firm*—Frishauf, Holtz, Goodman, Langer & Chick, P.C.

(57) ABSTRACT

A head controller 2 reads out adjustment data from a ROM 3 immediately after a power-on operation. The adjustment data is prepared for adjusting unevenness of light emission from LEDs in a LED head 5. A buffer memory 4 stores the read adjustment data. The head controller 2 reads the adjustment data from the buffer memory 4 with high data transfer rate, and obtains bitmap data from a frame memory or the like (not shown). The head controller 2 sends the read bitmap data and the adjustment data to an anode driver 51. The head controller 2 sends a strobe signal to the anode driver 51 and a cathode driver 53. The anode driver 51 adjusts ampere of supplied currents (i.e. drive signals corresponding to the bitmap data) from the head controller 2, in accordance with the received adjustment data in response to the reception of the strobe signal. The adjusted drive signals are sent to LED array chips 52. At the same time, the cathode driver 53 selects one of the LED array chips 52 in accordance with the received strobe signal so that the LEDs emit even lights. The optical writing head driving device 1 performs the above operations repeatedly to sequentially emit lights from the LEDs chip by chip under time sharing control for 1 line writing. As a result, the bitmap data is written onto a photosensitive member evenly at a high speed.

7 Claims, 11 Drawing Sheets

OPTICAL WRITING HEAD DRIVING DEVICE AND METHOD OF DRIVING OPTICAL WRITING HEAD

BACKGROUND OF THE INVENTION

1. Field of the Invention

The present invention relates to an optical writing head driving device and a method of driving the optical writing head which optically writes data onto a photosensitive member with a plurality of light-emitting diodes.

2. Description of the Related Art

Forming an electrostatic latent image onto a photosensitive member with lights from an optical writing head comprising a plurality of light-emitting diodes (LED) in an image forming apparatus such as a printer has been known as a conventional technique. In such a technique, for example, the LEDs are arranged in a line in the primary scanning direction, that is, in a direction perpendicular to the sheet feeding direction. The LEDs emit lights in accordance with image data and optically write the image data onto a photosensitive member.

Generally, the LEDs in the optical writing head emit lights unevenly because luminescence of each of the diodes differs from each other. The unevenness of the lights from the LEDs causes deterioration of an electrostatic latent image to be formed on the photosensitive member, and a resultant image on a sheet is also deteriorated.

To overcome the above problem, a modified optical writing head driving device can adjust unevenness of lights from LEDs in an optical writing head. FIG. 11 is a schematic diagram exemplifying such a conventional optical writing head driving device whose LEDs emit lights evenly.

An optical writing head driving device 100 shown in FIG. 11 comprises a ROM 101, a head controller 102, and an LED head 103.

The ROM 101 is an EEPROM or the like with small capacity, and inputs and outputs data serially. The ROM 101 previously stores adjustment data for adjusting unevenness of lights from LEDs in the LED head 103.

The head controller 102 reads out image data from a frame memory or the like (not shown), reads out the adjustment data from the ROM 101, and outputs the read image data and adjustment data to the LED head 103.

The LED head 103 comprises a plurality of LEDs arranged in a line in the primary scanning direction and a driver circuit which drives the LEDs to emit lights. The LED head 103 adjusts drive signals from the head controller 102. The drive signals correspond to the image data. The LEDs are driven in accordance with the adjusted drive signals and emit lights.

An operation of the optical writing head driving device 100 will now be described with reference to a timing chart shown in FIG. 12. The head controller 102 outputs a chip-select signal (CS) to the ROM 101, as a result, the ROM 101 is selected. The head controller 102 outputs a sync signal (SCK), a command for reading and address (Si) to the selected ROM 101. The head controller 102 serially reads out an 8-bit adjustment data (So) from the ROM 101 while being synchronized with the sync signal (SCK). The head controller 102 outputs the read adjustment data and the image data from the frame memory (not shown) to the LED head 103. The LED head 103 adjusts the drive signals from the head controller 102. The drive signals are prepared for driving the LEDs and correspond to the image data. The LEDs are driven in accordance with the adjusted drive signals and emit lights for optically writing image data onto the photosensitive member.

As described above, the optical writing head driving device 100 has to take steps of reading the adjustment data from the ROM 101 by the head controller 102 and outputting the adjustment data from the head controller 102 to the LED head 103, in order to make the LEDs emit lights evenly. Because of those required steps, it takes a longer time for optical writing in such a device than in a device without a light adjusting function.

Time (TW) for reading the adjustment data (So) for one line where the ROM 101 is an EEPROM whose clock frequency is 2 MHz and the number of the LEDs arranged in the LED head 103 in a line is 3840, is obtained by an equation of:

$$TW = \tfrac{1}{2}(MHz) \times 8(bit/dot) \times 3840(dots) \approx 16(msec.)$$

Velocity (Vppc) of the optical writing process where the resolution is 300 dpi (dots per inch: 1 inch=25.4 mm) is determined by the adjustment data reading time (TW) for one line with an equation of:

$$Vppc = 25.4(mm)/300(dpi) \div TW \approx 5.3(mm/sec.)$$

A printer or the like having the optical writing head driving device 100 as its printing section cannot realize high speed printing because its throughput is a couple of sheets per minutes when using sheets whose length in the sub scanning direction (i.e. the sheet feeding direction) is 210 mm.

SUMMARY OF THE INVENTION

It is an object of the present invention to provide an optical writing head driving apparatus and a method of driving an optical writing head which makes light-emitting diodes emit lights evenly but realize high speed optical writing.

To accomplish the above object, an optical writing head driving device according to a first aspect of the present invention comprises an optical head in which a plurality of light emitting elements are arranged in a line in the main scanning direction wherein said light emitting elements in said optical writing head emit lights in accordance with image data by which a photosensitive member is exposed, said optical writing head driving device comprises:

first storage means for previously storing adjustment data prepared for adjusting the quantity of light emission of each light emitting element in said optical writing head;

second storage means for storing adjustment data which is substantially the same as the adjustment data stored in said first storage means, whose data transfer rate is higher than that of said first storage means;

read means for reading out the adjustment data from said second storage means;

adjustment means for adjusting drive signals, which correspond to the image data and are prepared for driving said light emitting elements, in accordance with the adjustment data read out by said read means;

element select/drive means for sequentially selecting said light emitting elements in said optical writing head by a predetermined unit, and for driving said selected light emitting elements unit by unit; and drive signal supply means for supplying the drive signals adjusted by said adjustment means to said light emitting elements selected by said element select/drive means.

According to the above optical writing head driving device, the read means reads out the adjustment data in the second storage means prepared for adjusting the quantity of light emission of the light emitting elements with high data transfer rate. The adjustment means adjusts the drive signals, which correspond to the image data and are prepared for driving corresponding light emitting elements, in accordance with the adjustment data read out by the read means. The element select/drive means sequentially selects the light emitting elements in the optical writing head by a predetermined unit, and drives the selected light emitting elements unit by unit. The drive signal supply means supplies the adjusted drive signals to the selected light emitting elements. As a result, the optical writing head driving device realize even-light emission from the light emitting elements and high speed optical writing, because the adjustment data is read out from the second storage means with high data transfer rate and the drive signals are adjusted in accordance with the read adjustment data.

Said optical writing head comprises a plurality of light emitting element arrays each having a predetermined unit of said light emitting elements, and said light emitting element arrays are arranged in a line in the main scanning direction;

said element select/drive means sequentially select said light emitting elements in said optical writing head array by array, and drives said selected light emitting elements array by array; and said drive signal supply means supplies the drive signals adjusted by said adjustment means to corresponding light emitting elements in said light emitting element array selected by said element select/drive means. In this case, the optical writing head driving device realizes even-light emission from the light emitting elements and high speed optical writing because the adjustment data is read out from the second storage means with high data transfer rate, the drive signals are adjusted in accordance with the read adjustment data, and the adjusted drive signals are output to corresponding light emitting elements array by array.

The optical writing head driving device comprises adjustment data transfer means for transferring the adjustment data stored in said first storage means to said second storage means, in response to a predetermined initial operation. In this case, the optical writing head driving means transfers the adjustment data from the first storage means to the second storage means whose data transfer rate is higher than that of the first storage means, in response to an initial operation such as a power-on operation. The optical writing head driving device realize even-light emission from the light emitting elements and high speed optical writing, because the adjustment data is read out from the second storage means with high data transfer rate and the drive signals are adjusted in accordance with the read adjustment data during the optical writing operation.

Said light emitting elements are light-emitting diodes;

the drive signals are supplied currents; and said adjustment means adjust ampere of the supplied currents.

In this case, the optical writing head driving device realizes even-light emission from the LEDs and high speed optical writing, because the adjustment data is read out from the second storage means with high data transfer rate, the supplied currents are adjusted in accordance with the read adjustment data, and the adjusted currents are supplied to corresponding LEDs array by array.

To accomplish the above object, a method of driving an optical writing head according to a second aspect of the present invention, which comprises an optical writing head in which a plurality of light emitting elements are arranged in a line in the main scanning direction, wherein said light emitting elements emit lights onto a photosensitive member in accordance with image data, said method comprises the steps of:

transferring adjustment data, which is stored in a ROM prepared for adjusting the quantity of light emission of each light emitting element in said optical writing head, to a RAM;

supplying the adjustment data transferred to the RAM by said transferring step to a driver together with the image data;

sequentially selecting said light emitting elements in said optical writing head by a predetermined unit, and driving said selected light emitting elements unit by unit;

adjusting drive signals which correspond to the image data supplied by said supplying step and are prepared for driving said light emitting elements, in accordance with the adjustment data supplied by said supplying step; and outputting the adjusted drive signals adjusted by said adjusting step to said selected light emitting elements selected by said selecting/driving step.

According to the above method, the adjustment data, which is stored in the ROM and is prepared for adjusting the quantity of light emission of the light emitting elements in the optical writing head, is transferred to the RAM which has higher data transfer rate, by the transferring step. The transferred adjustment data and the image data are supplied to the driver by the supplying step. A predetermined unit of the light emitting elements in the optical writing head are selected by the element selecting/driving step, and the selected light emitting elements are driven by the element selecting/driving step unit by unit. The drive signals, which correspond to the image data supplied by the supplying step and are prepared for driving corresponding light emitting elements, are adjusted by the adjustment step in accordance with the adjustment data supplied by the supplying step. The adjusted drive signals adjusted are send to the selected light emitting elements by the drive signal outputting step. As a result, the method realizes even-light emission from the light emitting elements and high speed optical writing, because the adjustment data is read out from the RAM with high data transfer rate and the drive signals are adjusted in accordance with the read adjustment data.

Said optical writing head comprises a plurality of light emitting element arrays each having a predetermined unit of said light emitting elements, and said light emitting element arrays are arranged in a line in the main scanning direction;

said element selecting/driving step sequentially selects said light emitting elements in said optical writing head array by array, and drives said selected light emitting elements array by array; and said drive signal outputting step supplies the drive signals adjusted by said adjusting step to said light emitting elements selected by said element selecting/driving step array by array. In this case, the method realizes even-light emission from the light emitting elements and high speed optical writing, because the adjustment data is read out from the RAM with high data transfer rate, the drive signals are adjusted in accordance with the read adjustment data, and the adjusted drive signals are output to the light emitting elements array by array.

Said transferring step transfers the adjustment data, which is stored in the ROM and is prepared for adjusting the quantity of light emission of each light emitting element in said optical writing head, to the RAM in response to a predetermined initial operation. According to the method in this case, the adjustment data is transferred to the RAM which has higher data transfer rate than that of the ROM, in response to a predetermined initial operation such as a power-on operation. The method realize even-light emission from the light emitting elements and high speed optical writing, because the adjustment data is read out from the RAM with high data transfer rate and the drive signals are adjusted in accordance with the read adjustment data.

DETAILED DESCRIPTION OF THE PREFERRED EMBODIMENT

First Embodiment

An embodiment of the present invention will now be described with reference to the accompanying drawings.

Figure 1:
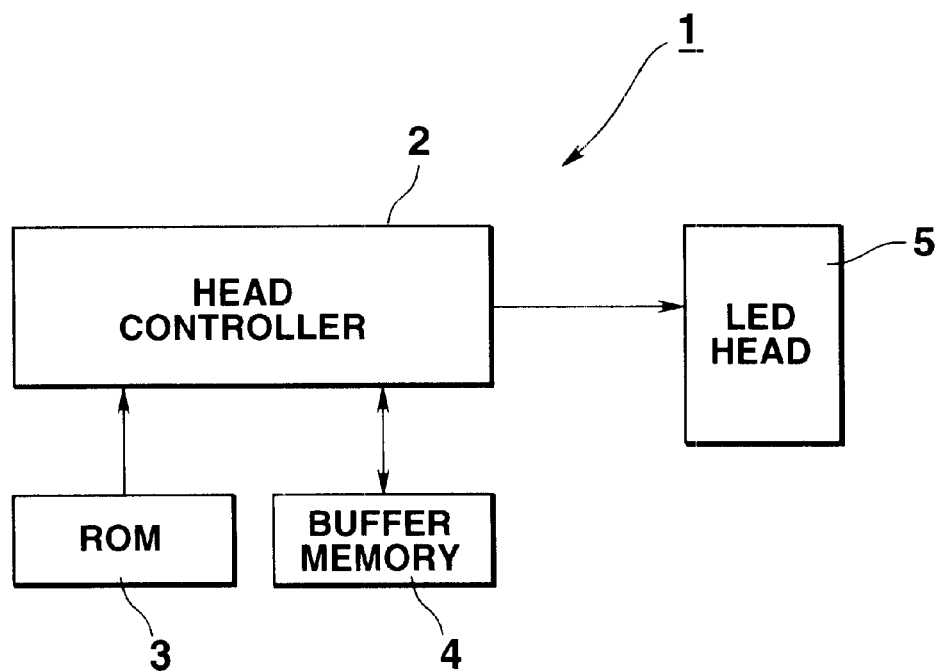
FIG. 1 is a schematic diagram showing an optical writing head driving device according to the first embodiment of the present invention.

FIG. 1 is a schematic diagram showing an optical writing head driving device according to the first embodiment. The optical writing head driving device is used for a printing section in an image forming apparatus such as a printer.

As shown in FIG. 1, an optical writing head driving device 1 comprises a head controller 2, a ROM 3, a buffer memory 4, and an LED head 5.

The head controller 2 obtains bitmap data (i.e. image data to be printed) from a frame memory (not shown) and adjustment data for adjust unevenness in light emission from LEDs in the LED head 5. The head controller 2 outputs the obtained bitmap data and adjustment data to the LED head 5.

The ROM 3 stores the adjustment data for adjusting unevenness in light emission from the LEDs in the LED head 5. The adjustment data is prepared based on previous measurement of actual unevenness in light emission from the LEDs in the LED head 5.

The buffer memory 4 is a RAM including bipolar type elements which enables the head controller 2 to read data from the buffer memory 4, or the like with high data transfer rate. The capacity of the buffer memory 4 is enough for storing the adjustment data prepared for all LEDs in the LED head 5. For example, the capacity of the buffer memory 4 is 3840 bytes (8 (bits/dot)×3840 (diodes). The buffer memory 4 initially (e.g. immediately after a power-on operation, or the like) reads out the adjustment data from the ROM 3 via the head controller 2.

Figure 2:
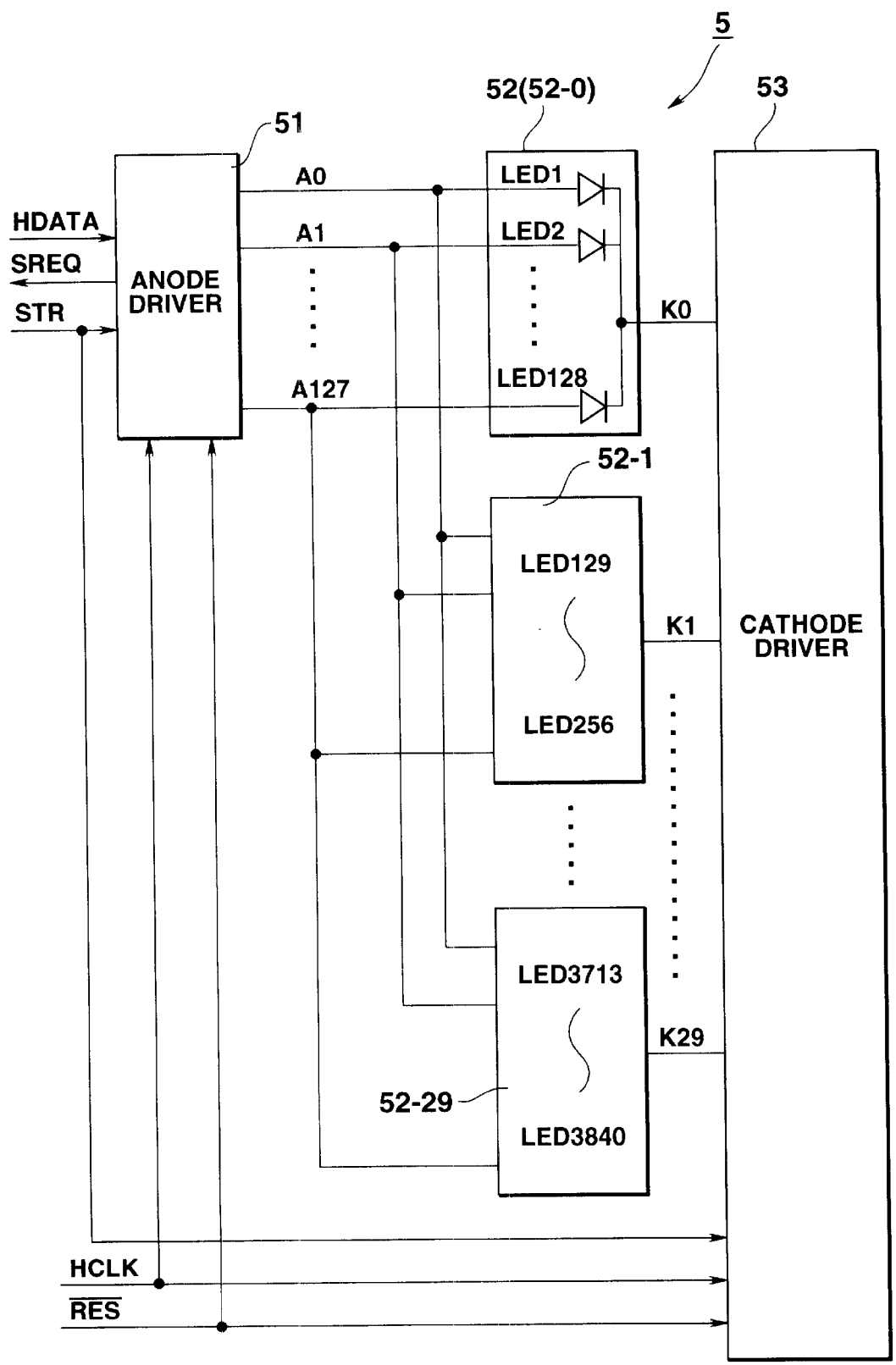
FIG. 2 is a circuit diagram exemplifying of an LED head according to the first embodiment of the present invention.

As shown in FIG. 2, the LED head 5 comprises an anode driver 51, an LED array chips 52 (52-0 to 52-29) and a cathode driver 53. The LED head 5 is under control of the head controller 2. The LEDs in the LED head 5 emit lights sequentially chip by chip under the time sharing control.

The anode driver 51 comprises a plurality of drive signal output terminals which are connected to the LED array chips 52. The number of the terminals is 128 (A0 to A127). After the anode driver 51 receives the bitmap data and adjustment data (HDATA) from the head controller 2, the drive signal output terminals (A0 to A127) sequentially output drive signals to the LED array chips 52-0 to 52-29 chip by chip under the time sharing control.

Before the drive signal output terminals output the drive signals, the anode driver 51 adjust ampere of supplied currents (i.e. the drive signals) corresponding to the bitmap data. The LED array chips 52 receive thus adjusted drive signals. For example, the abode driver 51 adjusts a drive signal for a target LED so as to be fifteen-sixteenth of originally supplied current, when the bitmap data corresponding to the target LED represents "1" (i.e. ON) and the adjustment data prepared for adjusting the drive signal for the target LED represents "1110" (hexadecimal data). The anode driver 51 supplies thus adjusted drive signal to the LED array chip 52 including the target LED.

The number of LED array chips 52 is 30 (52-0 to 52-29). Each of the LED array chips 52-0 to 52-29 comprises LEDs which are arranged in a line. The number of the LEDs in each array chip is 128. The LED array chips 52-0 to 52-29 are also arranged in a line so that the LEDs face a sheet in the main scanning direction which is a direction perpendicular to the sheet feeding direction.

Input terminals of the 128 LEDs in each array chip are connected to the drive signal output terminals (A0 to A127) respectively array by array. Output terminals (K0 to K29) of the LED array chips 52-0 to 52-29 are connected to the cathode driver 53. When any one of the LED array chips 52-0 to 52-29 receives the drive signals from the anode driver 51 after the sequential selecting by the cathode driver 53, the LEDs corresponding to the received drive signals emit lights. In other words, the LEDs in the LED array chips 52 are driven by the anode driver 51 and the cathode driver 53 under the time sharing control.

The cathode driver 53 sequentially selects the LED array chips 52-0 to 52-29 chip by chip in accordance with a strobe signal (STR) supplied from the head driver 2, so that the LEDs in the selected array chip are driven.

Figure 3:
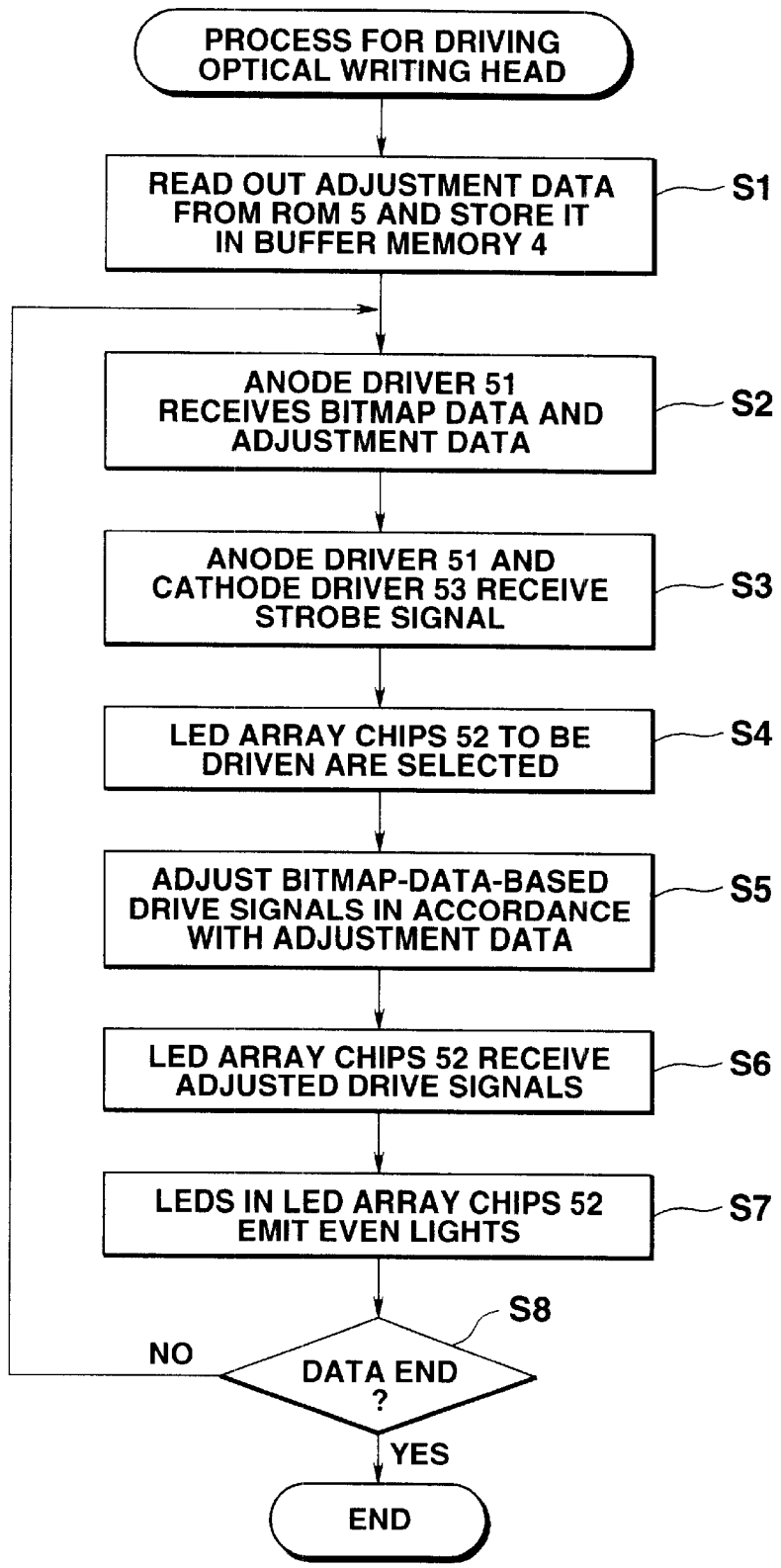
FIG. 3 is a flowchart for explaining an optical writing head driving process according to the first embodiment of the present invention.
Figure 4:
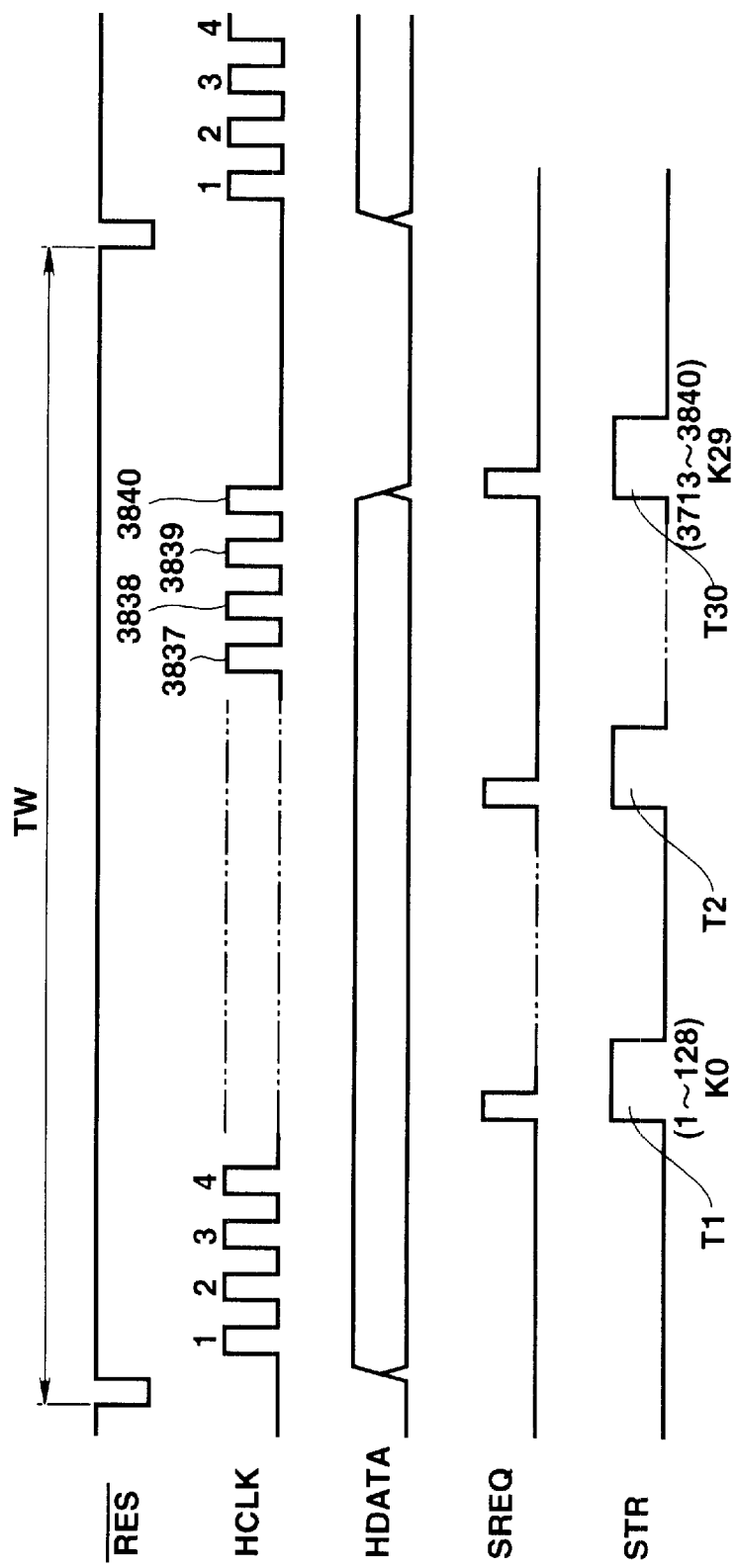
FIG. 4 is a timing chart for explaining an operation of the optical writing head driving device according to the first embodiment of the present invention.

An optical writing operation by the optical writing head driving device 1 shown in FIG. 1 will now be described with reference to FIGS. 3 and 4. FIG. 3 is a flowchart for explaining the process for driving the optical writing head in the optical writing head driving device 1. FIG. 4 is a timing chart showing on/off timings of signals used for the process shown in FIG. 3.

Before the optical writing operation starts, the head controller 2 reads the adjustment data prepared for adjusting unevenness in the light emission from the LEDs in the LED head 5 from the ROM 3. This data reading operation starts, for example, immediately after a printer, which has the optical writing head driving device 1 as its printing section, is turned on. The head controller 2 supplies the read adjustment data to the buffer memory 4 (step S1).

As shown in FIG. 4, writing cycles (TW) are at intervals between timings where a reset signal (RES) is low-leveled. During each writing cycle (TW), the head controller 2 performs the optical writing process for 1 line. The bitmap data and the adjustment data (HDATA) are synchronized with a clock signal (HCLK) by the head controller 2, and the head controller 2 supplies the resultant data to the anode driver 51 (step S2). More precisely, the head controller 2 reads out the adjustment data from the buffer memory 4 with high data transfer rate, and the head controller 2 sends the read adjustment data to the anode driver 51 together with the bitmap data read from the frame memory or the like (not shown).

After the head controller 2 sends the bitmap data and the adjustment data (HDATA) corresponding to the 128 LEDs in the LED array chip 52-0 to the anode driver 51 via the drive signal output terminals (A0 to A127), the head controller 2 waits for a request signal (SREQ) from the anode driver 51. When the head controller 2 receives the request signal (SREQ) from the anode driver 51, the head controller 2 sends the strobe signal (STR) to the anode driver 51 and the cathode driver 53 at a timing of T1 shown in FIG. 4 (step S3).

The cathode driver 53 selects the LED array chip 52-0 in accordance with the received strobe signal (STR) so that the LEDs (LED 1 to LED 128) are driven (step S4).

Simultaneously, the anode driver 51 adjust ampere of supplied currents (i.e. the bitmap-data-based drive signals) from the head controller 2 in accordance with the adjustment data (step S5), and sends the adjusted drive signals to the LED array chip 52-0 (step S6). As a result, the LEDs (LED 1 to LED 128) in the LED array chip 52-0 emit lights evenly in accordance with the bitmap data (step S7). For example, the quantity of light emission from the LED 1 is adjusted to be fourteen-sixteenth of the total quantity of light emission when the bitmap data corresponding to the LED 1 represents "1" (i.e. ON) and the adjustment data corresponding thereto represents "1101" (hexadecimal data).

The optical writing head driving device 1 performs steps S2 to S7 repeatedly until whole data processing is completed (step S8).

That is, the head driver 2 sends the bitmap data and the adjustment data (HDATA) corresponding to the next LED array chip 52-1 to the anode driver 51. The head controller 2 sends the strobe signal (STR) to the anode driver 51 and the cathode driver 53 at a timing of T2 shown in FIG. 4, after reception of the request signal (SREQ) from the anode driver 51. The cathode driver 53 selects the LED array chip 52-1 in accordance with the received strobe signal (STR) so that the LEDs (LED 129 to LED 256) are driven. At the same time, the anode driver 51 sends the adjusted drive signals to the LED array chip 52-1 in accordance with the strobe signal (STR). As a result, the LEDs (LED 129 to LED 256) in the LED array chip 52-1 emit lights evenly in accordance with the bitmap data.

In the same manner, the head controller 2 sends the bitmap data and the adjustment data (HDATA) for the LEDs chip by chip to the anode driver 51, and the LED array chips 52-2 to 52-29 are sequentially selected based on the strobe signal (STR), as a result, the LEDs emit even lights.

In the optical writing head driving device 1, the LEDs emit lights chip by chip sequentially under the time sharing control, thus, the bitmap data for 1 line is written onto the photosensitive member evenly.

For example, time (TW) for reading the adjustment data for 1 line, where the rate of reading the adjustment data of the buffer memory 4 is 5 MHz/dot, is obtained by an equation of:

$$TW = 1/5(MHz) \times 1(word/dot) \times 3840(dots) \approx 0.8(msec.)$$

Velocity (Vppc) of the optical writing process where the resolution is 300 dpi (dots per inch: 1 inch=25.4 mm) is determined by the time (TW) for reading the adjustment data for one line with an equation of:

$$Vppc = 25.4(mm)/300(dpi) \div TW \approx 105(mm/sec.)$$

As a result, high speed printing, whose throughput is 20 sheets per minute or more, onto a sheet, whose length in the sub scanning direction (i.e. the sheet feeding direction) is 210 mm, is realized with a printer or the like using the optical writing head driver 1 as its printing section.

The above first embodiment describes the operation of the LED head 5 in which the anode driver 51 outputs the drive signals sequentially to the LED array chips 52 chip by chip in response to the selection of the chip by the cathode driver 53. A plurality of the LED array chips 52 may be driven simultaneously.

Second Embodiment

An optical writing head driving device according to a second embodiment will now be described with accompanying drawings. In this embodiment, the optical writing head driving device selects two LED array chips simultaneously and drives them.

Figure 5:
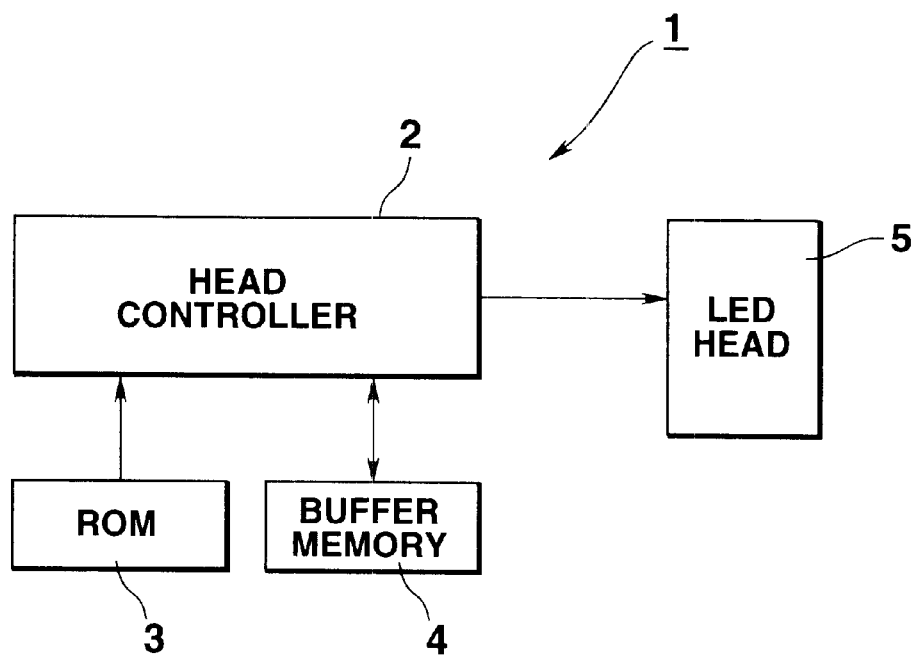
FIG. 5 is a schematic diagram showing an optical writing head driving device according to the second embodiment of the present invention.

FIG. 5 is a schematic diagram showing an optical writing head driving device according to the second embodiment. The optical writing head driving device is, for example, used for a printing section in an image forming apparatus such as a printer.

As shown in FIG. 5, the optical writing head driving device 1 comprises the head controller 2, the ROM 3, the buffer memory 4 and an LED head 6. The components except the LED head 6 of the optical writing head driving device 1 shown in FIG. 5 are the same as those of the optical writing head driving device 1 shown in FIG. 1.

Figure 6:
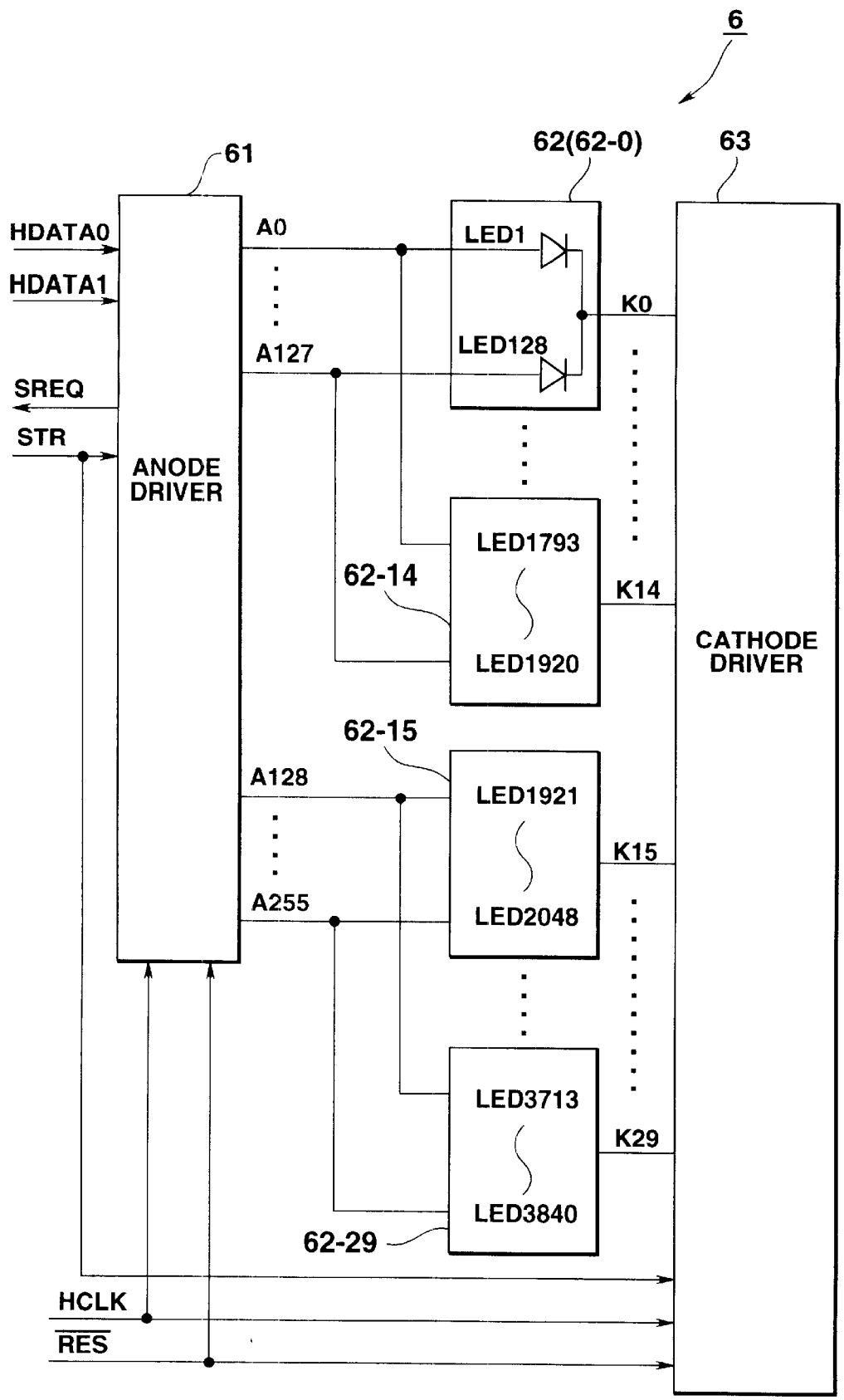
FIG. 6 is a circuit diagram exemplifying of an LED head according to the second embodiment of the present invention.

As shown in FIG. 6, the LED head 6 comprises an anode driver 61, an LED array chips 62 (62-0 to 62-29), and a cathode driver 63. The head controller 2 controls the LED head 6 to sequentially drive the LED array chips 62 under the time sharing control so that LEDs in two chips emit lights simultaneously.

The anode driver 61 comprises two units of drive signal output terminals. The number of terminals in each unit is 128. The terminals in the first unit (A0 to A127) are connected to the LED array chips 62-0 to 62-14, and those in the second unit (A128 to A255) are connected to the LED array chips 62-15 to 62-29. The anode driver 61 receives bitmap data and adjustment data (HDATA 0) for the LED array chips 62-0 to 62-14 from the head driver 2, and then sequentially sends drive signals to the LED array chips 62-0 to 62-14 chip by chip via the drive signal output terminals (A0 to A127) under the time sharing control. The anode driver 61 also receives bitmap data and adjustment data (HDATA 1) for the LED array chips 62-15 to 62-29 from the head controller 2, and then sequentially sends drive signals to the LED array chips 62-15 to 62-29 chip by chip via the drive signal output terminals (A128 to A255) under the time sharing control. The anode driver 61 simultaneously performs the above operations, that is, sending the bitmap data sets and the adjustment data sets (HDATA 0 and HDATA 1) to corresponding two array chips.

Before the above data sending, the anode driver 61 adjusts ampere of supplied currents, i.e. the bitmap-data-base driving signals, in accordance with the received adjustment data, and sends the adjusted drive signals to the LED array chips 62.

The number of the LED array chips 62 is 30 (LED array chips 62-0 to 62-29). Each of the LED array chips 62-0 to 62-29 has LEDs arranged in a line. The number of the LEDs in each chip is 128. The LED array chips 62-0 to 62-29 are arranged in a line so that the LEDs in those chips are arranged in the main scanning direction, that is, a direction perpendicular to the sheet feeding direction.

Input terminals of the LEDs in each of the LED array chips 62-0 to 62-14 (i.e. 128 LEDs in each chip) are connected to the drive signal output terminals in the first unit (A0 to A127) of the anode driver 61 respectively. Output terminals (K0 to K14) of the LED array chips 62-0 to 62-14 are connected to the cathode driver 63. Similarly, input terminals of the LEDs in each of the LED array chips 62-15 to 62-29 (i.e. 128 LEDs in each chip) are connected to the drive signal output terminals in the second unit (A128 to A255) of the anode driver 61 respectively. Output terminals (K15 to K29) of the LED array chips 62-15 to 62-29 are connected to the cathode driver 63.

When any one of the LED array chips 62-0 to 62-14 and any one of the LED array chips 62-15 to 62-29 which are selected by the cathode driver 63 receive the drive signals supplied by the anode driver 61 chip by chip, the LEDs in the selected two chips emit lights in accordance with the received drive signals. In short, the LEDs in the LED array chips 62 are driven by the anode driver 61 and the cathode driver 63 under the time sharing control.

The cathode driver 63 simultaneously performs sequential selections of any one of the LED array chips 62-0 to 62-14 and any one of the LED array chips 62-15 to 62-29 in accordance with the strobe signal (STR) from the head driver 2 so that the LEDs in the selected chips are driven.

Figure 7:
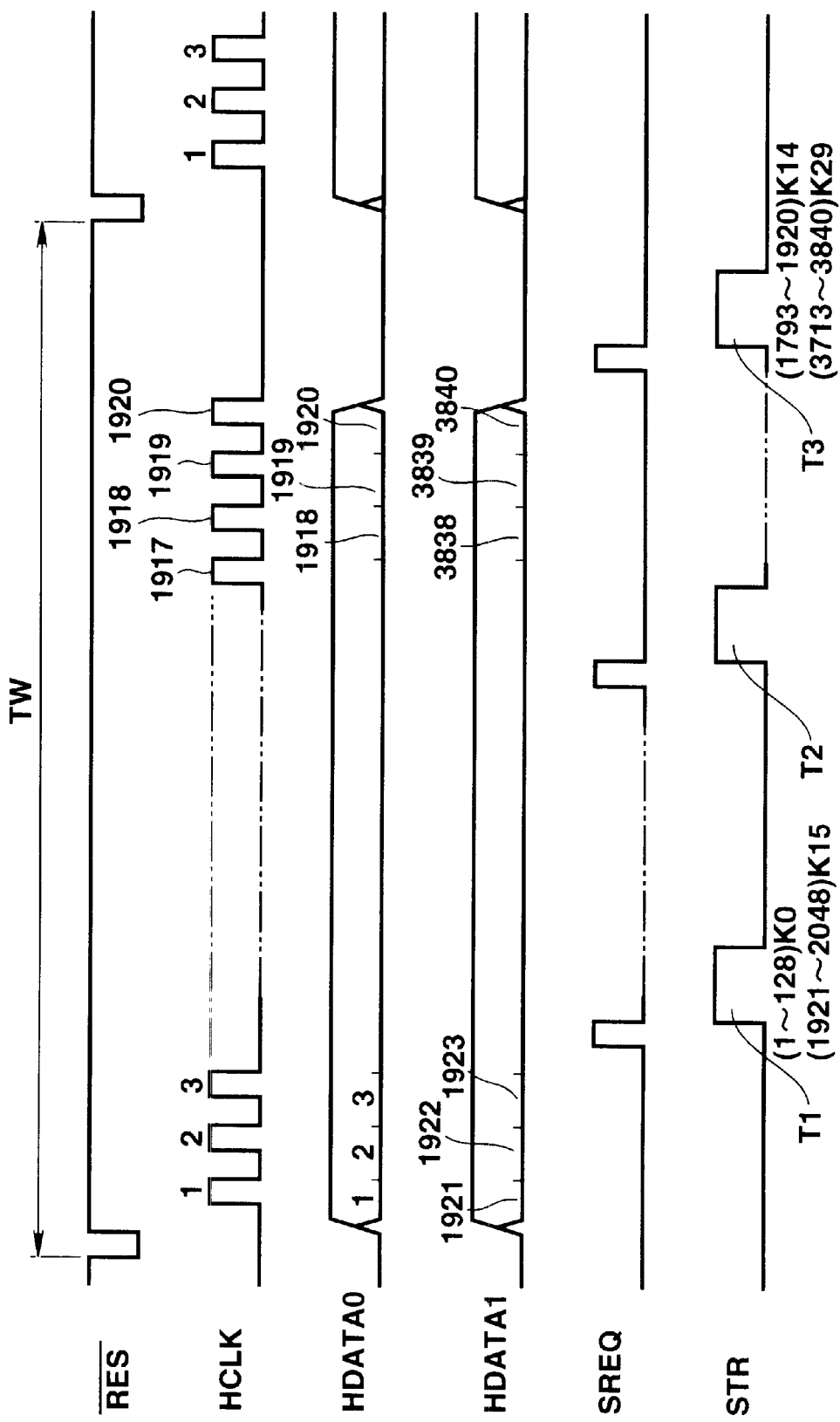
FIG. 7 is a timing chart for explaining an operation of the optical writing head driving device according to the second embodiment of the present invention.

An operation of the optical writing by the optical writing head driving device 1 shown in FIG. 5 will now be described with reference to FIG. 7. FIG. 7 is a timing chart showing on/off timings of signals used for the optical writing process performed by the optical writing head driving device 1.

Before the optical writing operation starts, the head controller 2 reads the adjustment data, which is prepared for adjusting unevenness in the light emission from the LEDs in the LED head 6, from the ROM 3. This data reading operation starts, for example, immediately after a printer, which has the optical writing head driving device 1 as its printing section, is turned on. The head controller 2 supplies the read adjustment data to the buffer memory 4.

As shown in FIG. 7, writing cycles (TW) are at intervals between timings where a reset signal (RES) is low-leveled. During each writing cycle (TW), the head controller 2 performs the optical writing process for 1 line. The bitmap data for the LED array chips 62-0 to 62-14 and the adjustment data (HDATA 0), and the bitmap data for the LED array chips 62-15 to 62-29 and the adjustment data (HDATA 1) are synchronized with a clock signal (HCLK) by the head controller 2, and the head controller 2 supplies the resultant data to the anode driver 61. More precisely, the head controller 2 reads out the adjustment data from the buffer memory 4 with high data transfer rate, and the head controller 2 sends the read adjustment data to the anode driver 61 together with the bitmap data read from the frame memory or the like (not shown).

The head controller 2 sends the bitmap data and the adjustment data (HDATA0) for the LEDs in the LED array chip 62-0 to the anode driver 61 via the drive signal output terminals (A0 to A127). Simultaneously, the head controller 2 sends the bitmap data and the adjustment data (HDATA1) for the LEDs in the LED array chip 62-15 to the anode driver 61 via the drive signal output terminals (A128 to A255). When the head controller 2 completes its data sending operation (i.e. sending bitmap data sets and adjustment data sets (HDATA 0 and HDATA 1) to the anode driver 61), the head controller 2 waits for a request signal (SREQ) from the anode driver 61. The head controller 2 sends a strobe signal (STR) to the anode driver 61 and the cathode driver 63 (at a timing T1) after reception of the request signal (SREQ) from the anode driver 61. The cathode driver 63 selects the LED array chips 62-0 and 62-15 in accordance with the received strobe signal (STR) so that the LEDs (LED 1 to LED 128 and LED 1921 to LED 2048) in the selected chips are driven. At the same time, the anode driver 61 adjusts ampere of supplied currents (i.e. the bitmap-data-based drive signals) from the head controller 2 in accordance with the received adjustment data. The adjusted drive signals are sent to the LED array chips 62-0 and 62-15. As a result, the LEDs in the LED array chips 62-0 and 62-15 (LED 1 to LED 128 and LED 1921 to LED 2048) emit lights evenly in accordance with the bitmap data.

Then the head controller 2 sends the bitmap data for the LED array chip 62-1 and adjustment data (HDATA 0) and the bitmap data for the LED array chip 62-16 and the adjustment data (HDATA 1) to the anode driver 61, and then sends the strobe signal (STR) to the anode driver 61 and the cathode driver 63 after the head controller 2 receives the request signals (SREQ) from the anode driver 61 (at a timing T2). The cathode driver 63 selects the LED array chips 62-1 and 62-16 in accordance with the received strobe signal (STR) so that the LEDs in the selected chips (LED 129 to LED 256 and LED 1049 to LED 2176) are driven. At the same time, the anode driver 61 sends the adjusted drive signals to the LED array chips 62-1 and 62-16 in accordance with the received strobe signal (STR). As a result, the LEDs in the LED array chips 62-1 and 62-16 (LED 129 to LED 256 and LED 2049 to LED 2176) emit lights evenly in accordance with the bitmap data.

In the same manner, the head controller 2 sends the bitmap data sets and the adjustment data sets (HDATA 0 and HDATA 1) for the LEDs in two array chips (i.e. 256 LEDs) to the anode driver 61 while sequentially selecting any one of the LED array chips 62-2 to 62-14 and any one of the LED array chips 62-17 to 62-29, in order to emit lights from the LEDs evenly.

Accordingly, the optical writing head driving device 1 makes the LEDs for 1 line emit lights sequentially under the time sharing control, so that the bitmap data for 1 line is written onto the photosensitive member evenly.

In the optical writing head driving device 1 described in the second embodiment, the buffer memory 4 is used to supply the adjustment data, therefore, the adjustment data is read out with high data transfer rate. The optical writing head driving device 1 according to the second embodiment drives two of the LED array chips 62 simultaneously. This improves optical writing speed so as to be twice times as higher than that resulted by the first embodiment.

Although the LED array chips in the LED head are driven sequentially under the time sharing control in the above described embodiment, all LED array chips may be driven simultaneously.

Another Embodiment

An optical writing head driving device according to another embodiment of the present invention will now be described with reference to the accompanying drawings. In this embodiment, the optical writing head driving device drives all LED array chips simultaneously.

Figure 8:
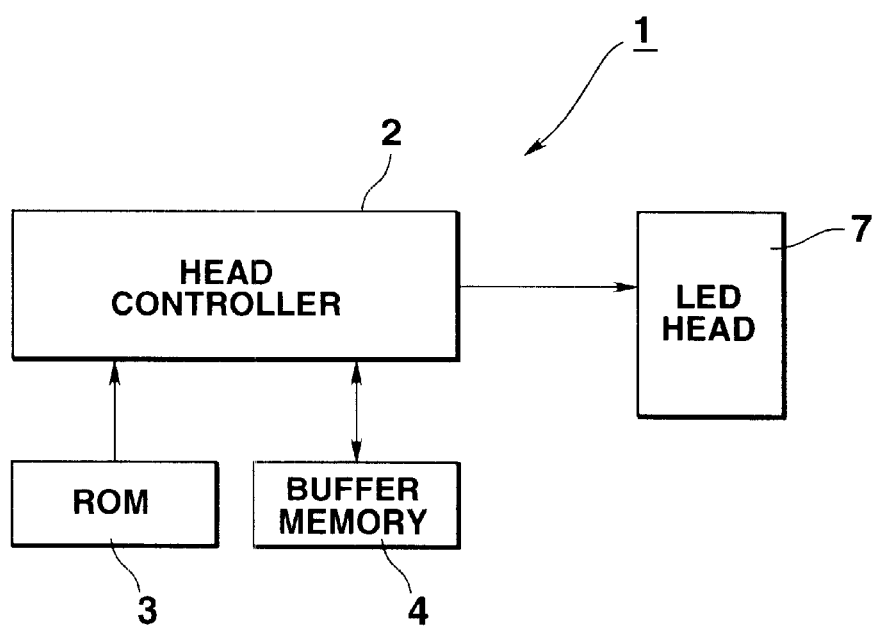
FIG. 8 is a schematic diagram showing an optical writing head driving device according to another embodiment of the present invention.

FIG. 8 is a schematic diagram showing an optical writing head driving device according to the second embodiment. The optical writing head driving device is, for example, used for a printing section in an image forming apparatus such as a printer.

As shown in FIG. 8, the optical writing head driving device 1 comprises the head controller 2, the ROM 3, the buffer memory 4 and an LED head 7. The components except the LED head 7 of the optical writing head driving device 1 shown in FIG. 8 are the same as those of the optical writing head driving device 1 according to the first embodiment shown in FIG. 1.

Figure 9:
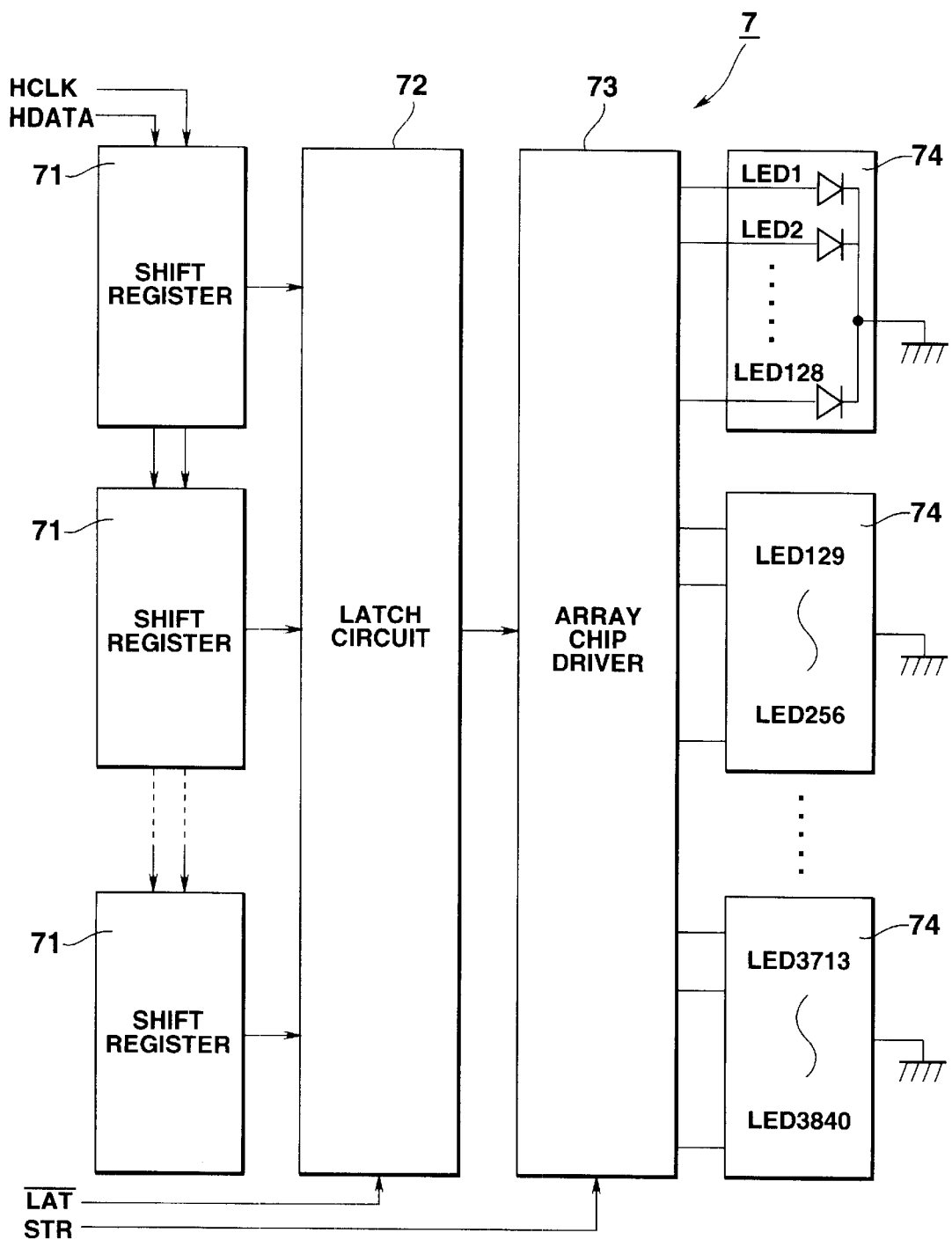
FIG. 9 is a circuit diagram exemplifying an LED head according to another embodiment of the present invention.

As shown in FIG. 9, the LED head 7 comprises shift registers 71, a latch circuit 72, an array chip driver 73, and LED array chips 74. The LED head 7 is under control of the head controller 2, and all LEDs in the LED array chips 74 are driven simultaneously.

Each of the shift registers 71 has serial-in/parallel-out structure. The shift registers 71 stores data corresponding to LEDs in all LED array chips 74 (i.e. 3584 LEDs). Operations of the shift registers 71 are synchronized with the clock signal (HCLK) from the head controller 2, sequentially receive the bitmap data and the adjustment data (HDATA) from the head controller 2, and output the bitmap data and the adjustment data for the 3584 LEDs to the latch circuit 72.

The latch circuit 72 outputs the received bitmap data and the adjustment data from the shift registers 71 to the array chip driver 73 in accordance with a latch signal (LAT) from the head controller 2.

The array chip driver 73 adjusts drive signals (i.e. supplied signals), which correspond to the bitmap data from the latch circuit 72, in accordance with the adjustment data. The adjusted drive signals are sent to the LED chips 74.

The number of the LED array chips 74 is 30. Each of the LED array chips 74 comprises LEDs arranged in a line. The number of the LEDs in each array chip is 128. The LED array chips 74 are arranged in a line so that the LEDs in the array chips are arranged in the main scanning direction which is a direction perpendicular to the sheet feeding direction.

Input terminals of the LEDs in the LED array chips 74 are connected to the array chip driver 73, and output terminals thereof are connected to grounds.

Figure 10:
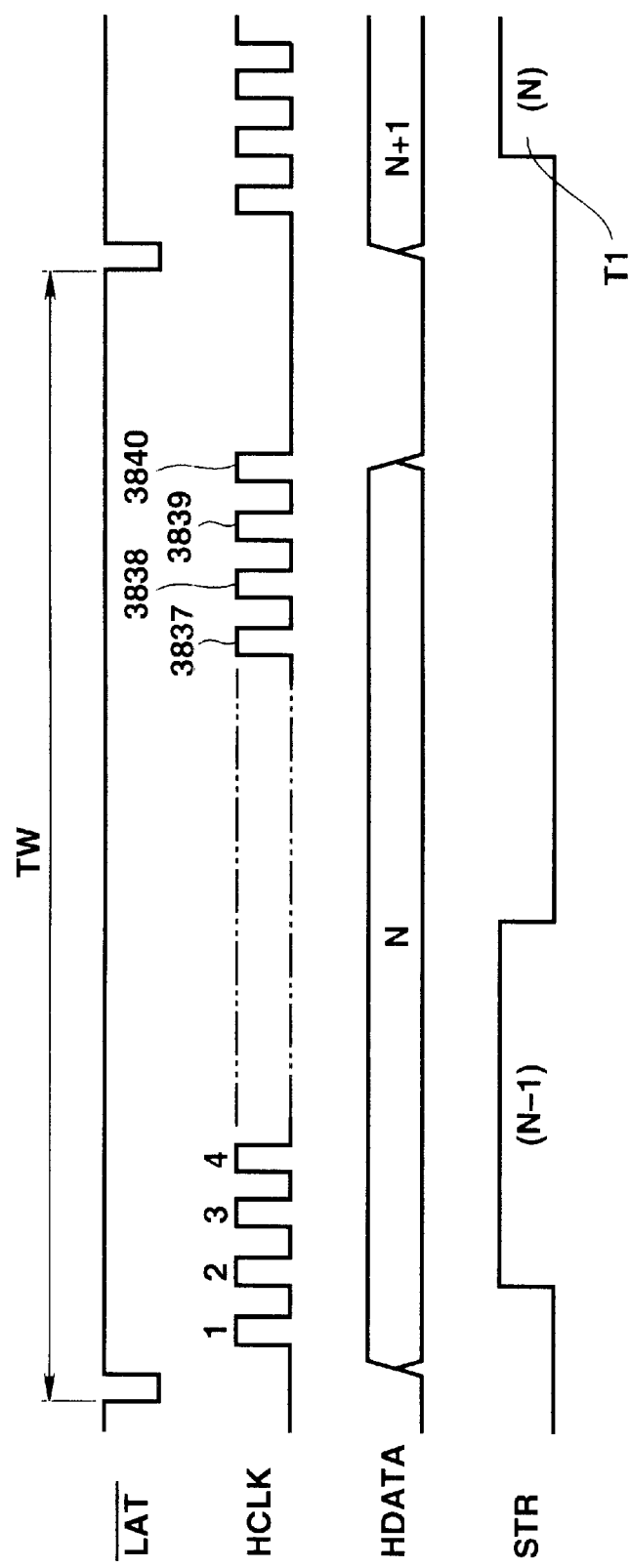
FIG. 10 is a timing chart for explaining an operation of the optical writing head driving device according to another embodiment of the present invention.
Figure 11:
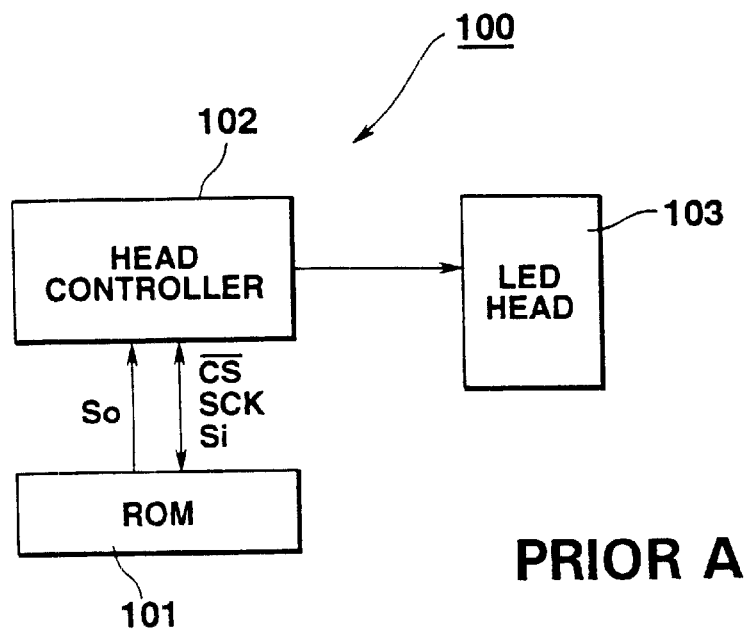
FIG. 11 is a schematic diagram exemplifying a conventional optical writing head driving device.
Figure 12:
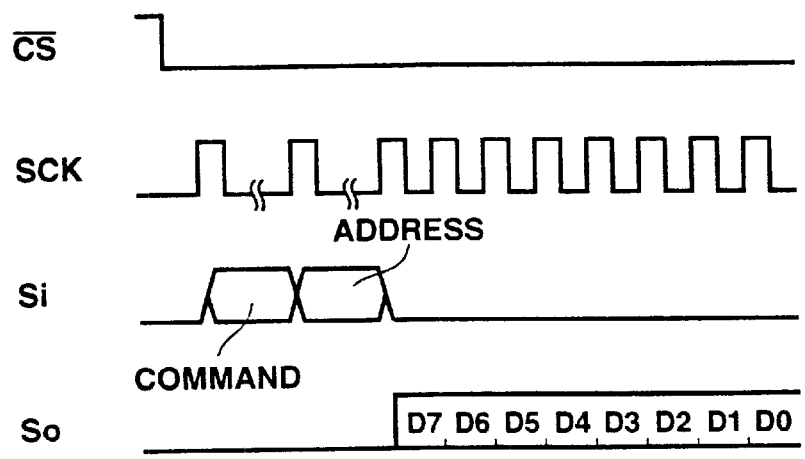
FIG. 12 is a timing chart for explaining an operation of the conventional optical writing head driving device.

An optical writing operation by the optical writing head driving device 1 shown in FIG. 8 will now be described with reference to FIG. 10. FIG. 10 is a timing chart showing on/off timings of signals used for the optical writing process by the optical writing head driving device 1.

Before the optical writing operation starts, the head controller 2 reads the adjustment data prepared for adjusting unevenness in the light emission from the LEDs in the LED head 7 from the ROM 3. This data reading operation starts, for example, immediately after a printer, which has the optical writing head driving device 1 as its printing section, is turned on. The head controller 2 supplies the read adjustment data to the buffer memory 4.

As shown in FIG. 10, writing cycles (TW) are at intervals between timings where the latch signal (LAT) is low-leveled. During each writing cycle (TW), the head controller 2 performs the optical writing process for 1 line. The bitmap data for the LED array chips 72 and the adjustment data (HDATA) are synchronized with the clock signal (HCLK) by the head controller 2, and the head controller 2 supplies the resultant data to the shift registers 71. More precisely, the head controller 2 reads out the adjustment data from the buffer memory 4 with high data transfer rate, and the head controller 2 sends the read adjustment data to the shift registers 71 together with the bitmap data read from the frame memory or the like (not shown).

After the data supply of the bitmap data and the adjustment data (HDATA) to the shift registers 71 is completed, the head controller 2 sends the strobe signal (STR) to the array chip driver 73 (at a timing T1) during the next writing cycle (TW). The array chip driver 71 adjusts ampere of supplied currents (i.e. the bitmap-data-based drive signals) in accordance with the received strobe signal (STR), and the adjusted drive signals are sent to the LED array chips 74 As a result, the LEDs in the LED array chips 74 for 1 line (LED 1 to LED 3840) emit lights evenly in accordance with the bitmap data.

Although amperage of the supplied currents (i.e. the drive signals) are adjusted in accordance with the adjustment data in order to emit even lights from the LEDs in the above described embodiment, alternatively the time for current flowing may be adjusted in accordance with the adjustment data while maintaining the amperage of the supplied currents.

In the above embodiment, the optical writing head comprising the LED array chips is described, however, an optical writing head comprising other optical writing elements may be used.

What is claimed is:

1. An optical writing head driving device comprising:

an optical head in which a plurality of light emittng arrays are arranged in a line in a main scanning direction, each said light emitting array comprising a cathode terminal, an anode terminal, and a predetermined number of light emitting elements that each emit light onto a photosensitive member in accordance with image data;

first storage means for storing adjustment data which is obtained based on a quantity of light emission from each said light emitting element measured while said optical writing head is controlled to emit light, said adjustment data being prepared for adjusting the quantity of light emission from each said light emitting element;

second storage means, having a higher data transfer rate than a data transfer rate of said first storage means, for also storing the adjustment data;

adjustment data transferring means for transferring the adjustment data from said first storage means to said second storage means in response to a predetermined initial operation performed substantially before a printing process begins;

read means for reading out the adjustment data from said second storage means;

adjustment means for adjusting drive signals, which correspond to the image data and which are prepared for driving said light emitting elements, in accordance with the adjustment data read out by said read means;

element select/drive means for sequentially selecting said light emitting elements of each said light emitting array, and for driving said selected light emitting elements unit by unit;

drive signal supply means for supplying said adjusted drive signals to said selected light emitting elements; and strobe signal generation means for generating a strobe signal which determines drive timings to be assigned to each of the light emitting arrays during each writing cycle for one line, and for supplying the generated strobe signal to said element select/drive means and said drive signal supply means;

wherein said element select/drive means sequentially applies a selection signal to the cathode terminal on a target light emitting array each time said element select/drive means receives the strobe signal to select the target light emitting array;

wherein said read means reads out the adjustment data from said second storage means lust before said element select/drive means applies the selection signal to the target light emitting array;

wherein said adjustment means adjusts an amperage of the drive signals for the light emitting elements determined by the image data in accordance with the adjustment data read-out by said read means; and wherein said drive signal supply means supplies the drive signals whose amperage has been adjusted by said adjustment means to the anode terminal on the array to which the selection signal is applied by said element select/drive means, each time said drive signal supply means receives the strobe signal.

2. The optical writing head driving device according to claim 1, wherein said predetermined initial operation comprises an initial process which is performed after a power source is applied to said device.

3. The optical writing head driving device according to claim 1, wherein the predetermined initial operation is performed before the printing process begins.

4. A method of driving an optical writing head in which a plurality of light emitting arrays are arranged in a line in a main scanning direction, each said light emittinq array comprising a cathode terminal, an anode terminal, and a predetermined number of light emitting elements that each emit light onto a photosensitive member in accordance with image data, said method comprising:

transferring adjustment data which is stored in a ROM to a RAM, said adjustment data being obtained based on a quantity of light emission from each said light emitting element measured while said optical writing head is controlled to emit light, and said adjustment data being prepared for adjusting the quantity of light emission from each said light emitting element;

generating a strobe signal which determines drive timings to be assigned to each of said light emitting arrays during each writing cycle for one line;

sequentially applying a selection signal to the cathode terminal on a target light emitting array at timings determined by the strobe signal;

reading out corresponding adjustment data from the RAM just before the target light emitting array receives the selection signal;

adjusting an amperage of the drive signals for the light emitting elements determined by the image data in accordance with the adjustment data read out from the RAM; and sequentially applying the drive signals having the adjusted amperage to the anode terminal on the array to which the selection signal is applied based on the timings determined by the strobe signal.

5. The method of driving the optical writing head according to claim 4, wherein:

said light emitting elements are sequentially selected array by array, and driven array by array; and said adjusted drive signals are outputted to said selected light emitting elements array by array.

6. The method of driving the optical writing head according to claim 5, wherein said adjustment data, which is stored in the ROM and which is prepared for adjusting the quantity of light emission of each light emitting element, is transferred to the RAM in response to a predetermined initial operation performed substantially before a printing process begins.

7. The method of driving the optical writing head according to claim 4, wherein said adjustment data, which is stored in the ROM and which is prepared for adjusting the quantity of light emission of each light emitting element, is transferred to the RAM in response to a predetermined initial operation performed substantially before a printing process begins.

* * * * *